United States Patent [19]

Maki et al.

[11] Patent Number: 4,860,161
[45] Date of Patent: Aug. 22, 1989

[54] ENCLOSED SWITCHBOARD

[75] Inventors: Kazuyoshi Maki; Masayuki Otsubo; Shizutaka Uchida, all of Saga, Japan

[73] Assignee: Togami Electric Mfg. Co., Saga, Japan

[21] Appl. No.: 187,663

[22] PCT Filed: Jul. 27, 1987

[86] PCT No.: PCT/JP87/00547
§ 371 Date: Mar. 7, 1988
§ 102(e) Date: Mar. 7, 1988

[87] PCT Pub. No.: WO88/01107
PCT Pub. Date: Feb. 11, 1988

[30] Foreign Application Priority Data

Jul. 30, 1986 [JP] Japan .................. 61-180743

[51] Int. Cl.⁴ .......................................... H02B 11/12
[52] U.S. Cl. ................................ 361/338; 200/50 AA; 361/339; 361/343
[58] Field of Search ..................... 200/50 AA; 361/335–344, 332, 339

[56] References Cited

U.S. PATENT DOCUMENTS 3,663,773  5/1972  Powell ................... 200/50 AA
4,051,335  9/1977  Ericson et al. .......... 200/50 AA
4,112,269  9/1978  Nelson et al. .......... 200/50 AA
4,317,160  2/1982  Tillson et al. ............ 361/339

FOREIGN PATENT DOCUMENTS 52-108548  8/1977  Japan .

Primary Examiner—J. R. Scott
Attorney, Agent, or Firm—Jordan and Hamburg

[57] ABSTRACT

An enclosed switchboard has a contact frame fitted with contacts which can move relative to a unit frame having with a circuit breaker, a molded case circuir breaker, an electromagnetic switch, an auxiliary relay, a fuse, an earth fault relay, and a timer mounted thereon. This permits the operation of the contacts in disconnected, test, and connected positions with the unit frame loaded in fixed position in the panel frame. As a result, the front door of the panel frame can be closed even in the test and disconnected positions, preventing an electric shock during running and the emission of arcs and substances out of the panel in case of accidents, and avoiding dangers of injuries and damage due to collisions because of the passage being blocked with open doors, which consequently provides a safe switchboard. In addition, the need of removing and keeping the unit separately can be eliminated.

15 Claims, 5 Drawing Sheets

ENCLOSED SWITCHBOARD

FIELD OF ART

The present invention relates to an enclosed switchboard such as a motor control center and the like.

BACKGROUND OF THE INVENTION

For enclosed switchboards such as motor control centers, in general, a box-like panel frame is divided by shelves into a plural number of compartments, each compartment accommodating a pullout control unit. The control unit is of such a circuit configuration that various pieces of control equipment including a circuit breaker, an electromagnetic switch, and a control relay are placed on a common frame to provide a desired control function. The main circuit, or occasionally the control circuit thereof is so constructed as to automatically connect to and disconnect from the corresponding circuit on the panel frame side by a put-in and pull-out operation.

Contacts are so arranged on the rear of the control unit that putting in the control unit brings a power contact into connection with a bus bar (generally a vertical bus bar) arranged on the panel frame of the switchboard, through which power is supplied to each on-board piece of equipment. This also brings a load contact into connection with the load side terminal, thereby supplying the load side with power switched on and off by way of the control unit.

The enclosed switchboard provided with such a drawer type control unit is so designed that the front door of the panel frame can be closed only with the units in their retracted positions. Meanwhile, in the test and disconnected positions with the contacts drawn out of the bus bars the control units are projected from the front of the panel frame, preventing closing of the door.

In the conventional switchboard described above the door can not be closed in the disconnected and test positions but only in the connected position, necessitating that the door be left open while checking the interior, in the testing position or the disconnected position. However, leaving the door open impairs the enclosed function of the switchboard, allowing for electric shock and other dangers due to the emission of arcs and substances out of the switchboard in case of accidents. It may also block the passage and hamper operators from going through, sometimes causing injuries or damage due to accidental bumping.

For these reasons, when any control unit need not be placed in the connected position for a long time, it is removed and kept separately so as to allow the door of the switchboard to be closed to maintain its enclosed function and keep the passage open.

Taking into account the above background, the purpose of the present invention is to provide an enclosed switchboard in which the door can be closed in the disconnected and test positions of the control units thereof as well as in its connected position.

SUMMARY OF THE INVENTION

In order to achieve this purpose, the enclosed switchboard of the present invention has an equipment mounting unit frame set retractably in a shelf of a panel frame, a contact frame fitted with a power contact connecting and disconnecting with a bus bar wired in the panel frame and a load contact connecting and disconnecting with a load side terminal, the contact frame being mounted movably in the connecting and disconnecting direction of the unit frame, a lever linking mechanism built in the unit frame and converting the turning motion of an operating handle situated at the front of the unit frame to a traveling motion toward and from the unit frame, the linking mechanism being provided with a mechanism limiting the corresponding position of the contact mounting frame when the contacts are in the respective positions connected to and disconnected from the bus bar and the load side terminal, the limiting mechanism being equipped with a different mechanism for releasing a limited state to provide an operable state through a limit releasing operation prior to operating the handle in each limited position as well as releasing the operable state by the handle in each limited position to return back to the limited state, and positions and dimensions set in such a way that the unit frame, the contact mounting frame, and the lever linking mechanism may not prevent closure of the front door of the panel frame in any position.

In the present invention, a unit frame is mounted on a shelf, which has a circuit breaker, a molded case circuit breaker, an electromagnetic switch, an auxiliary relay, a fuse, a ground fault relay, and a timer on board. The unit frame has a contact frame provided with a power connecting contact and a load connecting contact so set on the rear that the frame can move in the connecting and disconnecting directions of the contacts, e.g., in the forward and backward directions of the switchboard. The contact frame is so constructed that the operation of the handle at the front of the unit frame permits the contact frame to move between the disconnected, test, and connected positions.

The positions and dimensions of the parts are so designed that, even while the contact frame is in the disconnected or test position, the parts are not projected largely toward the front, thereby contributing to a smooth closing of the front door of the panel frame.

Thus, the front door of the panel frame may be closed even when the contacts are in the disconnected or test position from the bus bar or load terminal arranged in the panel frame.

DESCRIPTION OF THE PREFERRED EMBODIMENT

The following detailed description deals with the preferred embodiments of the present invention illustrated in the accompanying drawings.

Figure 1:
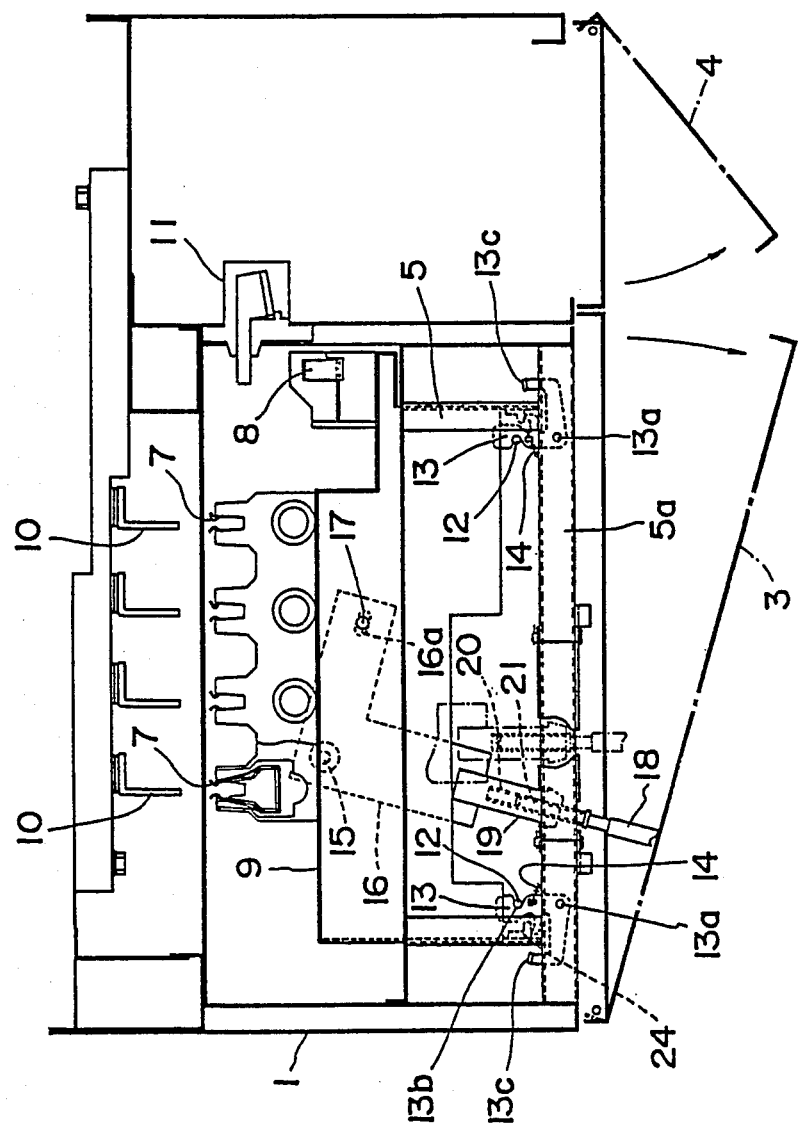
FIG. 1 is a cross sectional plan of an enclosed switchboard showing an embodiment of the present invention.
Figure 2:
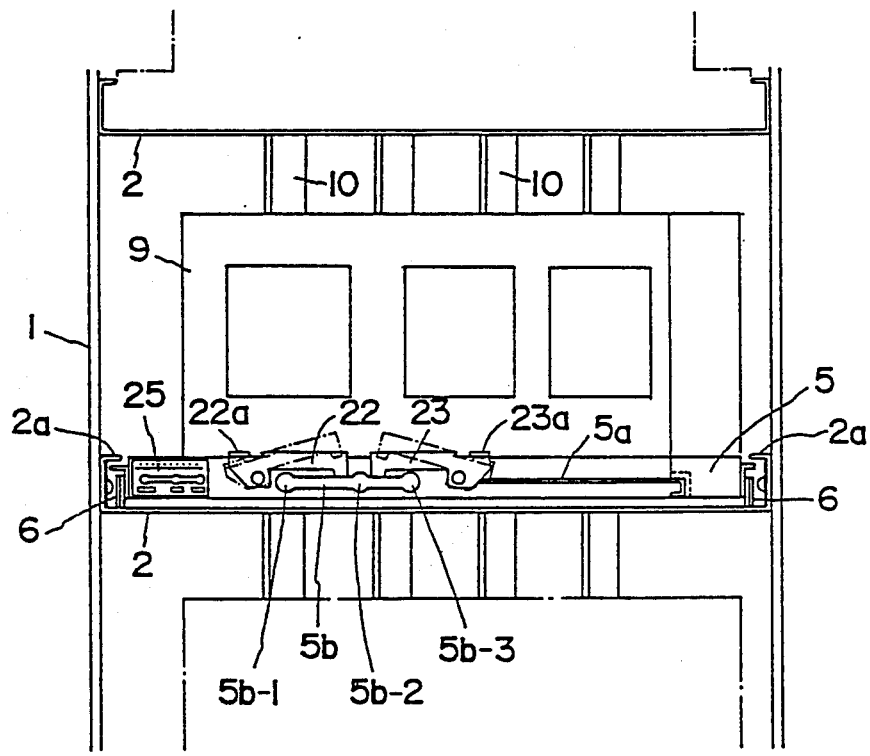
FIG. 2 is a front view of the primary part thereof.

FIG. 1 is a cross sectional plan of a switchboard of the present invention accommodating a unit frame and a contact frame, and FIG. 2 is a partial front view thereof. In the drawings, a panel frame 1 constitutes the boxlike body of the switchboard, and shelves 2 and doors 3, 4 are fixed to panel frame 1 shelf 2 is fitted with guide frames 2a. A unit frame 5 provided with various pieces of equipment is inserted and placed along guide frames 2a from the front of the panel frame 1. A roller 6 is fitted to permit loading of the unit frame 5 with a light force. The unit frame 5 has a contact mounting frame 9 equipped with a power contact 7 and a load contact 8 so mounted on the rear as to move in the connecting and disconnecting directions of contacts 7 and 8 or depthwise in relation to unit frame 5. The contacts 7 and 8 are wired using wires (not shown) with the on-board pieces of equipment of the unit frame 5.

The panel frame 1 has a bus bar 10, such as a 3-phase 4-wire system, and a load-side terminal 11 to which power contact 7 and load contact 8 are to be connected respectively.

Shelf 2 has lock pins 12 so embedded in two portions that, when the unit frame 5 is inserted along the shelf 2, a pin 12 is engaged with a groove 13b on the front side (clockwise) of a hook 13 pivotally mounted at the middle to the unit frame 5 at an axis 13a to prevent the frame 5 from slipping out. A spring 14 energizes the hook 13 clockwise to maintain the engagement between pin 12 and groove 13b and a lever 13c is provided for releasing the engagement.

Figure 3A:
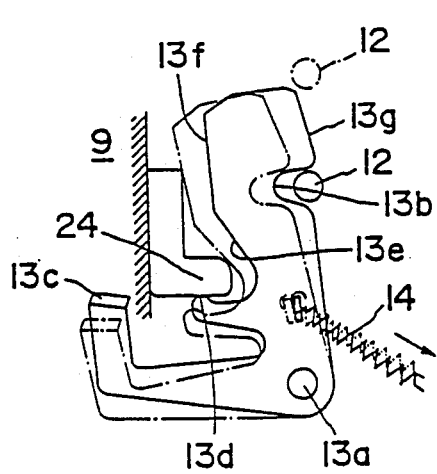
FIGS. 3(a) and (b) are explanatory views showing the engaging relation between the hook and the lock pin, in the disconnected position and in the testing and connected positions respectively.

As shown in FIGS. 3(a) and (b), the hook 13 has a projection 13d, an indent 13e, and a straight portion 13f formed on the back, which act on an actuator 24 fixed onto the contact mounting frame 9. When the contact mounting frame 9 is disconnected from the unit frame, as shown in FIG. 3(a), the actuator 24 forces the projection 13d against the energizing force of the spring 14, causing the hook 13 to slightly pivot around the axis 13a and thereby withdraw a little from the lock pin 12. Retracting the unit frame 5 together with the contact mounting frame 9 along the shelf 2 causes the lock pin 12 shown in a broken line in FIG. 3(a) to come into contact with the cam slant 13g of the hook 13, travel the hook 13 slightly inclined left, and finally engage with the groove 13b thereof as shown in a continuous line. The unit frame 5 can be smoothly removed from the shelf 5 by pulling the frame 5 with the release lever 13c pressed by hand to the state shown in the chain dotted line, which releases the engagement between the lock pin 12 and the hook 13.

Figure 3B:
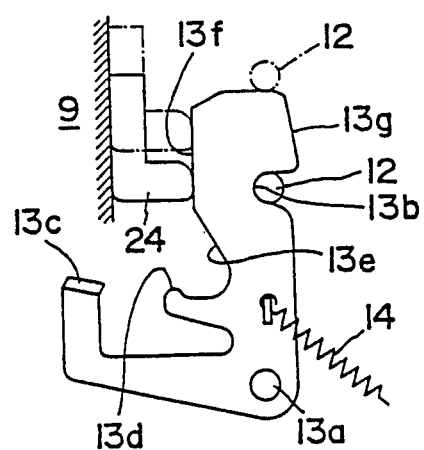

When the contact mounting frame 9 is in the test or connected position in relation to the unit frame 5, the possible retraction of the unit frame 5 along the shelf 2 will lead to the direct connection of the contacts to the power source, which could prove to be dangerous. Pulling the unit frame 5 out of the shelf 2 in the test or connected position is also dangerous. Therefore, the construction should be such that, when the contact frame 9 is in the test and connected positions in relation to the unit frame 5, as shown in FIG. 3(b), the actuator 24 is in contact with the straight portion 13f of the hook 13 on the back. In FIG. 3(b), the actuator 24 is shown in the test position by the continuous line, and in the connected position by the chain dotted line. While the contact mounting frame 9 is positioned in such a relation with the unit frame, the hook 13 cannot be pivoted by the actuator 24, thus enabling hook 13 to prevent the lock pin 12 fixed on the shelf 2 from being engaged or disengaged. Accordingly, in the state shown in FIG. 3(b), this prevents the unit frame 5 from being placed on the shelf 2 as well as preventing the mounted unit frame 5 from being removed in spite of the pressure of the release lever 13c. In this way, the loading and release of the unit frame is allowed only in the disconnected position of the contacts, making contributions to improvement in safety.

The unit frame 5 is fitted with an interlocking arm 16 pivotally mounted around an interlocking arm pivot 15 embedded in said unit frame 5 for driving the contacts, while the contact mounting frame 9 is provided with a driving shaft 17, which is inserted in a slot 16a provided at the edge of the interlocking arm 16 for floatable engagement therein. An operating rod 19 is fixed at the bottom of the interlocking arm 16 for engaging with the operating handle 18 which moves the contact mounting frame 9 to its test and connected positions, with the edge of the operating rod 19 facing a slot 5b opened in a frontal structure. 5a at the front of the unit frame 5.

Figure 4:
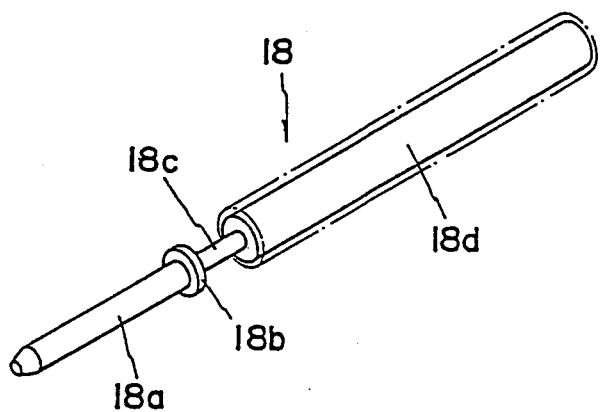
FIG. 4 is a perspective view of the operating handle.
Figure 8:
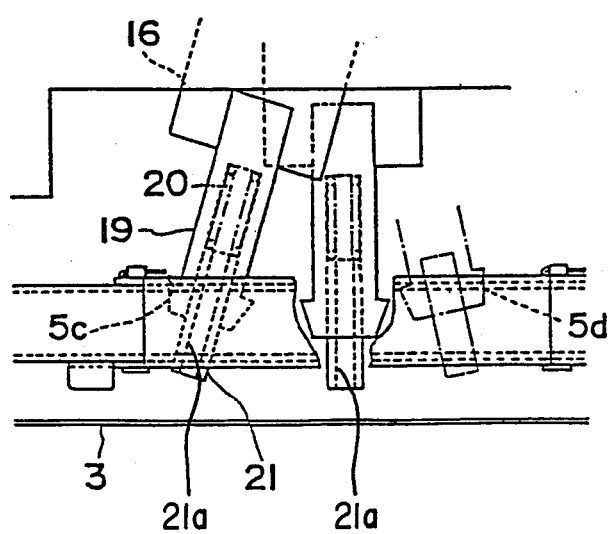
FIG. 8 is an explanatory view showing the relation between the operating rod and the stopper.

The operating rod 19 contains a lock collar 21, pressurized forward by a spring 20, having a guide hole 21a in the center thereof as shown in FIG. 8, in which the edge of the operating handle 18 shown in FIG. 4 is inserted. The operating handle 18 consists of inserted edge 18a, a collar 18b, an extra small portion 18c and a grip 18d, the grip 18d having applied thereto a rubber coating. The inserted edge 18a has a diameter larger than the width of the slot 5b of the frontal structure 5a shown in FIG. 2 and smaller than the diameters of notches 5b-1, 5b-2, and 5b-3. The diameter of the extra small portion 18c is smaller than the width of the slot hole 5b, and the diameter of the collar 18b is larger than that of the guide hole 21a of the lock collar 21, larger than the width of the slot 5b of the frontal structure 5a, and smaller than the diameters of the notches 5b-1, 5b-2, and 5b-3. This prevents the operating handle 18 from being inserted in the lock collar 21 in any other position of the slot 5b than notches 5b-1, 5b-2, and 5b-3, and permits the handle 18 to be released only at the notches 5b-1, 5b-2, and 5b-3 on the slot 5b once the handle 18 has been inserted in the lock collar 21. At the notches 5b-1, 5b-2, and 5b-3 the energizing force of the spring 20 causes the edge of the lock collar 21 to project slightly forward therefrom. The lock collar 21 has the edge of a diameter slightly smaller than those of the notches 5b-1, 5b-2, and 5b-3, thereby permitting the collar when projected as mentioned above to engage with the notches and lock.

Figure 7:
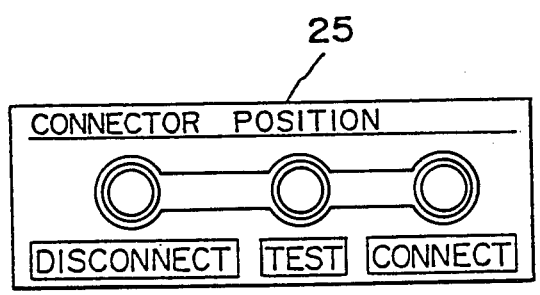
FIG. 7 is a detailed front view of the name-plate.

Thus, turning the operating handle 18, the edge thereof being inserted in the lock collar 21, clockwise in the drawing moves the contact unit 9 to its test and connected positions. Referring to FIG. 2, the three notches of a larger diameter 5b-1, 5b-2, and 5b-3 of the slot 5b indicate the disconnected, test, and connected positions respectively, only in which positions the edge of the operating handle 18 can be inserted therein and removed therefrom. At the notch 5b-2 corresponding to the middle test position are provided checking position stoppers 22 and 23 which pivot to make way for the operating handle when moving from the other notches 5b-1 and 5b-3, and block its movement from the notch 5b-2, and thereby preventing the handle 18 from inadvertently shifting from its test position to its disconnected or connected position as well as from moving directly to the connected position when any attempt is made to shift the handle from the disconnected position to the test position. The operation of the handle 18 is achieved by pushing a protruded piece 22a of the stopper 22 or 23a of the stopper 23 to raise the other end, thus allowing the handle 18 to move freely. In the drawings a contact position indicating name-plate 25 shows the position of the contact operating mechanism or interlocking arm 16 and the contact position, whose details are shown in FIG. 7.

In addition, stoppers 5c and 5d (see FIG. 8.) are provided on the grip frame 5a to bring the operating rod 19 to a halt when the operating rod 19 gets actuated at the ends of the slot 5b and the edge of the operating rod 19 has reached the notch 5b-1 or 5b-3. These stoppers 5c and 5d are so arranged as to contact with the trapezoidal head formed at the edge of the operating rod 19, the slant side of the trapezoidal head being so designed as to contact with the stoppers 5c and 5d nearly at a right angle thereto.

Figure 5:
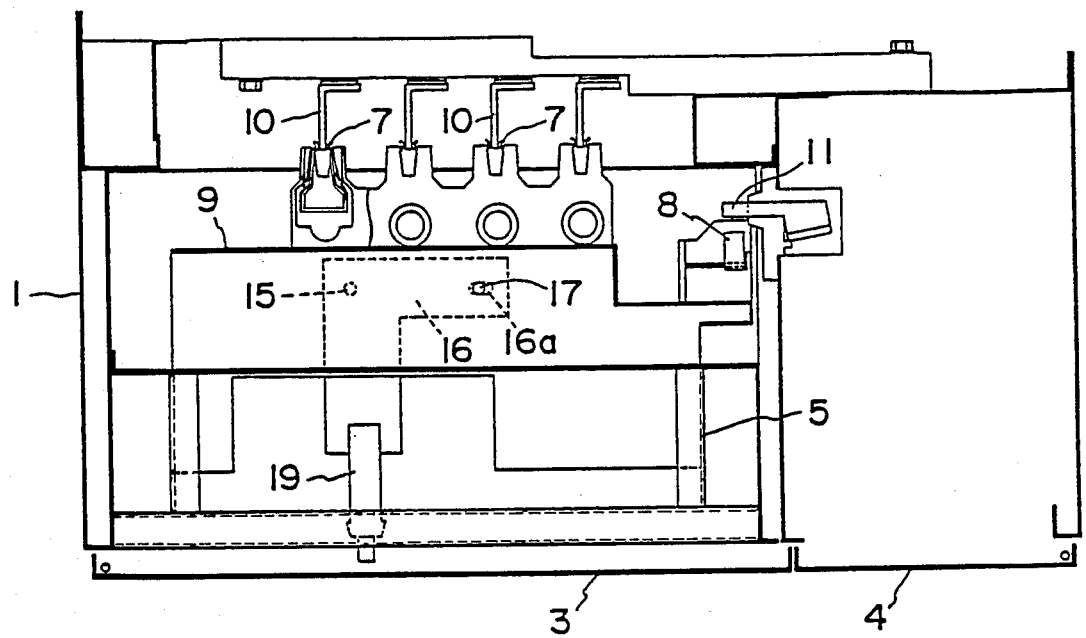
FIGS. 5 and 6 are plan views showing the respective states of the contact unit in the test and connected positions.
Figure 6:
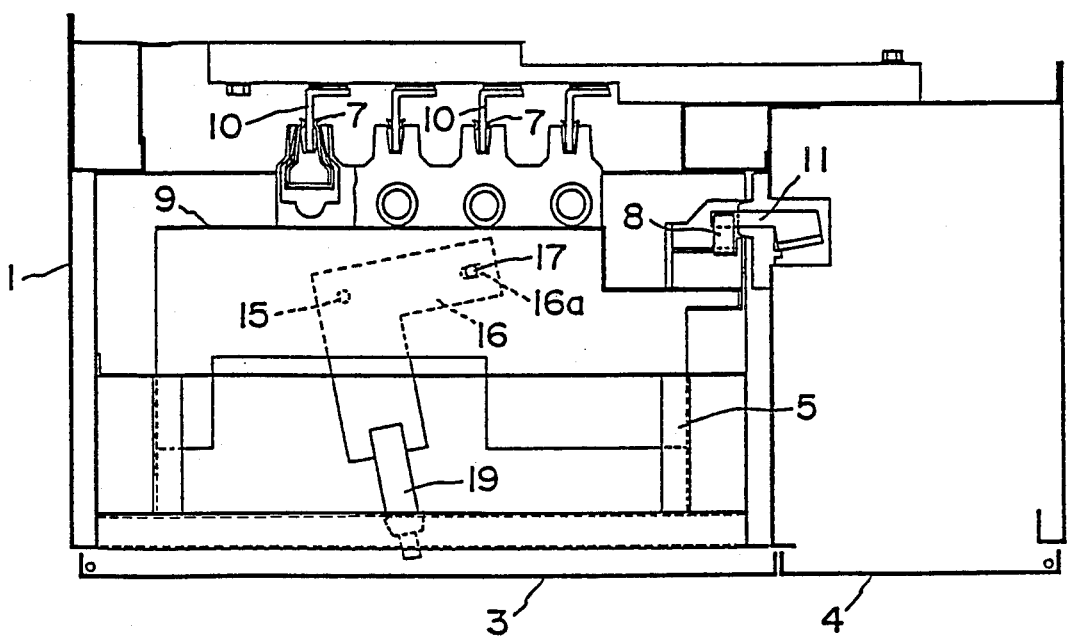

FIGS. 5 and 6 respectively show the states where the contact mounting frame 9 moves to its test and connected positions by way of the operating handle 18.

In the test position as shown in FIG. 5, the power contact 7 is in contact with the bus bar 10 to supply power to the on board equipment of the unit frame 5, while the load contact 8 is in such a position as to keep out of contact with the load side terminal 11 affording enough space for disconnection, thereby providing the power supply to the equipment to be subjected to the test without any supply to the loads.

In the connected position shown in FIG. 6, both the power contact 7 and the load contact 8 are connected to the bus bar 10 and the load side terminal 11 respectively, which is the normal operating state.

In this way, the panel frame 1 in the present invention can accommodate the unit frame 5 in a fixed position where the door 3 can be closed and the contact mounting frame 9 can be operated to the disconnected, test, and connected positions.

As described above, in the present invention the contact frame fitted with contacts is so designed as to travel toward and from the unit frame with the equipment on board, thereby permitting the operation of the contacts to their disconnected, test, and connected positions with the unit frame loaded in place in the panel frame.

Thus, the front door of the panel frame can be closed in the test and disconnected positions, thereby preventing an electric shock while running and the emission of arcs and substances included out of the panel in case of accidents, and avoiding dangers of injuries and damages due to collision because of an open door blocking the passage, which consequently provides a safe switchboard. Furthermore, the closure of the door in the test and disconnected positions eliminates the need of removing and keeping the unit separately.

INDUSTRIAL FEASIBILITY

The present invention can be utilized in the field of manufacturing transmission and distribution equipment.

We claim:

1. An enclosed switchboard comprising a panel frame having a front opening, door means mounted on said panel frame for opening and closing off said front opening, fixed contact means mounted on said panel frame, a unit frame slidably mounted on said panel frame, lock means operably connected between said unit frame and said panel frame for locking said unit frame in a locked position on said panel frame, a contact mounting frame having mounted contacts, said contact mounting frame being slidably mounted on said unit frame between at least one operable position wherein at least one of said mounted contacts is in contact with at least one of said fixed contacts and a disconnect position wherein none of said mounted contacts are in contact with said fixed contacts, an operating lever pivotably mounted on said unit frame for pivotal movement about a pivotal axis, said operating lever having two leg portions with one leg portion being operably connected to said contact mounting frame such that pivotal movement of said operating lever about said pivotal axis moves said contact mounting frame between said at least one operable position and said disconnect position, said operating lever having another leg portion, said other leg portion having handle-receiving means, a handle means insertable into and removeable from said handle-receiving means and operable when inserted into said handle-receiving means to pivot said operating lever about said pivot axis and thereby move said contact mounting frame between said at least one operable position and said disconnect position, said contact mounting frame being disposed within said panel frame such that said door means can be closed when said contact mounting frame is in said at least one operating position and when in said disconnect position.

2. An enclosed switchboard according to claim 1, wherein said operating lever is an L-shaped lever, said operable connection between said one leg portion and said contact mounting frame comprising a slot in said one leg portion and a pin slidable in said slot, said pin being mounted on said contact mounting frame.

3. An enclosed switchboard according to claim 1, wherein said fixed contact means comprises first and second fixed contacts, said contact mounting frame having first and second mounted contacts, said at least one operating position of said contact mounting frame constituting a first operating position wherein said first and second mounted contacts engage said first and second fixed contacts respectively, said contact mounting frame having a second operating position wherein said first mounted contacts engage said first fixed contacts while said second mounted contacts are disengaged from said second fixed contacts, said door means being closeable when said contact mounting frame is in either of said first and second operating positions.

4. An enclosed switchboard according to claim 3, wherein said first operating position is designated a connect position and said second operating position is designated a test position, said test position being intermediate said connect position and said disconnect position.

5. An enclosed switchboard according to claim 1, wherein said panel frame has a plurality of shelves each slidably mounting a unit frame on which a contact mounting frame is slidably mounted.

6. An enclosed switchboard according to claim 1, wherein said lock means comprises a locking lever pivotal on said unit frame about a pivotal axis between a locking and a release position, lock engageable means on said panel frame engaged by said locking lever when said locking lever is in said locked position and released by said locking lever when said locking lever is in said released position, and interlock means on said contact mounting frame which engages said locking lever when said contact mounting frame is in said at least one operating position to prevent said locking lever from pivoting from its locked to its released position.

7. An enclosed switchboard according to claim 6, wherein said locking lever has an interlock-engaging surface juxtaposed to an indentation, said interlock means on said contact mounting frame engaging said interlock-engaging surface when said locking lever is in said locked position, said interlock means being disposed in said indentation when said locking lever is in said release position.

8. An enclosed switchboard according to claim 7, wherein said locking lever has a projection engageable by said interlock means when said contact mounting frame is slid relative to said unit frame to effect pivoting of said locking lever about its pivotal axis.

9. An enclosed switchboard according to claim 6, wherein said lock means comprises biasing means biasing said locking lever in said locked position, said locking lever having a release portion adapted to be manually manipulated to pivot said locking lever from its locked to its release position in opposition to said biasing means.

10. An enclosed switchboard according to claim 6, wherein said lock engageable means comprises a pin, said locking lever having an indentation receiving said pin when said locking lever is in said locked position, said locking lever having an inclined edge portion juxtaposed to said indentation, said inclined edge portion being engageable by said pin to pivot said locking lever as said unit frame is slid on said panel frame.

11. An enclosed switchboard according to claim 1, wherein said unit frame has a frontal structure having an elongated slot, said handle means passing through said slot.

12. An enclosed switchboard according to claim 11, wherein said handle means comprises an insertable section having a first diameter, a collar, an intermediate section having a second diameter, said collar being between said insertable section and said intermediate section, and a grip section extending from said intermediate section, said insertable section being insertable into said handle-receiving means of said other leg portion of said operable lever, said elongated slot having spaced circular enlargements, said slot between said enlargements having a slot width, said spaced circular enlargements each having an enlargement diameter, said first diameter being greater than said slot width and less than said enlargement diameter, said second diameter being less than said slot diameter, said handle-receiving means having a hole for receiving said insertable section, said collar having a diameter greater than the diameter of said hole, greater than said slot width, and less than said enlargement diameter, whereby said handle means can be inserted into and removed from said handle-receiving means only when said handle-receiving means is aligned with one of said three enlargements in said elongated slot.

13. An enclosed switchboard according to claim 12, wherein said handle-receiving means has a spring biased locking collar and a spring biasing said locking collar in a direction to biasingly lock said locking collar selectively in each of said three enlargements.

14. An enclosed switchboard according to claim 12 further comprising stoppers on said frontal structure of said unit frame for limiting the pivotal movement of said handle-receiving means.

15. An enclosed switchboard according to claim 12, wherein there are three linearly aligned enlargements spaced along said slot, one end enlargement being designated a disconnect position, the other end enlargement being designated a connect position, and the intermediate enlargement being designated a test position, and blocking means mounted on said frontal structure for movement between a blocking and a non-blocking position, said blocking means when in said blocking position precluding movement of said handle-receiving means along said slot between said positions.

* * * * *